(12) United States Patent
Szafraniec

(10) Patent No.: US 7,075,659 B2
(45) Date of Patent: Jul. 11, 2006

(54) HETERODYNE OPTICAL NETWORK ANALYSIS THAT UTILIZES SIGNAL MODULATION

(75) Inventor: Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 358 days.

(21) Appl. No.: 10/772,808

(22) Filed: Feb. 5, 2004

(65) Prior Publication Data
US 2005/0174577 A1 Aug. 11, 2005

(51) Int. Cl.
*G01B 9/02* (2006.01)
*G01N 21/00* (2006.01)

(52) U.S. Cl. .................. 356/484; 356/491; 356/73.1
(58) Field of Classification Search .............. 356/73.1, 356/484, 491
See application file for complete search history.

(56) References Cited

U.S. PATENT DOCUMENTS

| | | | | |
|---|---|---|---|---|
| 5,619,325 | A * | 4/1997 | Yoshida | 356/491 |
| 5,644,398 | A * | 7/1997 | Yoshida | 356/484 |
| 6,671,056 | B1 * | 12/2003 | Szafraniec | 356/484 |
| 6,801,320 | B1 * | 10/2004 | Szafraniec | 356/484 |
| 6,882,428 | B1 * | 4/2005 | Baney et al. | 356/491 |
| 6,888,625 | B1 * | 5/2005 | Anderson | 356/73.1 |
| 2003/0112424 | A1 * | 6/2003 | Gordon et al. | 356/73.1 |
| 2004/0021864 | A1 * | 2/2004 | McAlexander et al. | 356/73.1 |
| 2005/0062978 | A1 * | 3/2005 | Krause et al. | 356/477 |

OTHER PUBLICATIONS

Dyer, S.D., Rose, A. H., and Rochford, K. B., Fast and Accurate Measurement of the Dispersion of Cascaded Components, 2001.
Niemi, Tapio, Uusimaa, Maria, and Ludvigsen, Hanne, Limitations of Phase-Shift Method in Measureing Dense Group Delay Ripple of Fiber Bragg Gratings, 2001.
Imamura, Motoki and Yamashita, Tomoyu, Simultaneous and High Resolution Measurement of Polarization Mode Dispersion, Group Delay, Chromatic Dispersion and Amplitude for Ultra-High Speed Optical Components, 2001.

* cited by examiner

*Primary Examiner*—Gregory J. Toatley, Jr.
*Assistant Examiner*—Patrick J. Connolly

(57) ABSTRACT

The group delay of a DUT is measured by modulating test and reference portions of a local oscillator signal at different frequencies to create modulation sidebands, applying the modulated test portion of the local oscillator signal to the DUT, and then optically mixing the two modulated signals. Optically mixing the two modulated signals translates the optical frequencies down to electrical frequencies. Phase changes that are caused by the DUT are determined by measuring the phase differences between modulation sidebands of the test portion of the local oscillator signal. Frequency translation can be achieved by electrical mixing instead of optical mixing.

22 Claims, 12 Drawing Sheets

Test Arm

Reference Arm

Test Arm

Reference Arm

After Mixing

DUT Arm

Reference Arm

HETERODYNE OPTICAL NETWORK ANALYSIS THAT UTILIZES SIGNAL MODULATION

FIELD OF THE INVENTION

The invention relates generally to characterizing an optical property of a device under test (DUT), and more particularly, to techniques for measuring the amplitude, phase, and group delay of a DUT.

BACKGROUND OF THE INVENTION

Determining the optical characteristics of optical components and networks is a critical element to the successful design and operation of optical communications networks. Important characteristics of an optical component or network are the amplitude, phase, and group delay response measured in either transmission or reflection. Polarization dependent characteristics of an optical component or network include polarization dependent loss (PDL) and differential group delay (DGD). The characteristic of group delay is of particular interest because it is relatively difficult to measure using conventional techniques. Group delay is defined as the negative of the derivative (rate of change) of a component or network's phase response (i.e., the phase term $\phi(\omega)$ of the component transfer function $H(\omega)=a(\omega) \exp(j\phi(\omega))$, where $a(\omega)$ denotes the amplitude response). That is, group delay is a measure of phase linearity and is defined by the equation:

$$\tau_g = \frac{-\partial \varphi}{\partial \omega}$$

where $\omega$ is angular optical frequency (in radians/second).

Group delay is traditionally measured using a known modulation phase-shift method. The modulation phase-shift method is a relative measurement technique that is essentially unaffected by environmental and physical instabilities such as changes in temperature and vibrations. A drawback to the modulation phase-shift method is that its dynamic range is limited because it relies on direct detection.

Group delay has also been measured using various interferometry-based methods. Interferometry-based methods provide better dynamic range than the modulation phase-shift method. However, known interferometry-based methods are extremely sensitive to environmental and physical instabilities such as changes in temperature and vibrations.

SUMMARY OF THE INVENTION

In accordance with the invention, the group delay of a DUT is measured by modulating test and reference portions of a local oscillator signal at different frequencies to create modulation sidebands, applying the modulated test portion of the local oscillator signal to the DUT, and then optically mixing the two modulated signals. Optically mixing the two modulated signals translates the optical frequencies down to electrical frequencies. Phase changes that are caused by the DUT are determined by measuring the phase differences between modulation sidebands of the test portion of the local oscillator signal. Because the phase changes are derived by measuring the phase differences between modulation sidebands, the group delay characterization is, for practical purposes, insensitive to environmental and physical instabilities. Furthermore, because the characterization is based on the interference of two portions of the local oscillator signal, the process involves an optical heterodyne and, as such, has a wide dynamic range. Frequency translation may be achieved by electrical mixing instead of optical mixing. For example, the test portion of the local oscillator signal is modulated at a first frequency to create modulation sidebands, applied to the DUT, and then optically mixed with a reference portion of the local oscillator signal to generate an electrical signal. The electrical signal that is generated from the optical mixing of the test and reference portions of the local oscillator signal is then electrically mixed with an electrical signal to accomplish the frequency translation.

DETAILED DESCRIPTION OF THE INVENTION

Figure 1:
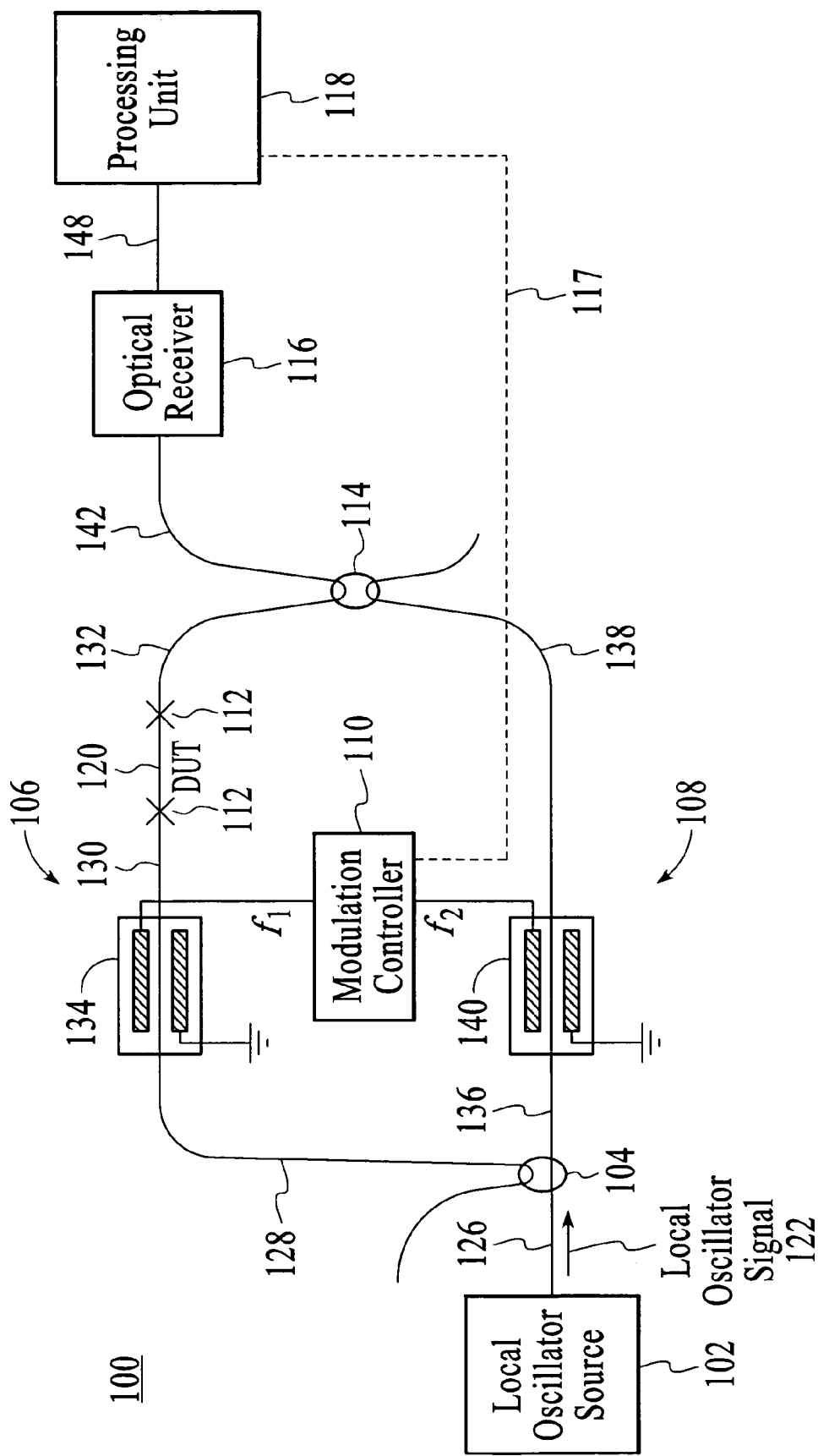
FIG. 1 depicts an embodiment in accordance with the invention of a system for measuring the amplitude, phase, and group delay response of a DUT that includes a test arm having a test signal modulator and a reference arm having a reference signal modulator.

FIG. 1 depicts an embodiment in accordance with the invention of a system 100 that is used to measure the amplitude, phase, and group delay properties of a DUT. The system includes a local oscillator source 102, an optical splitter 104, a test arm 106, a reference arm 108, a modulation controller 110, a DUT interface 112, an optical combining unit 114, an optical receiver 116, and a processing unit 118. For description purposes, the system is connected to a DUT 120 although the DUT is not necessarily a part of the system. It should be noted that throughout the description similar reference numbers may be utilized to identify similar elements.

Referring to FIG. 1, the local oscillator source 102 generates a local oscillator signal 122. In an embodiment, the local oscillator source is a highly coherent tunable laser that is swept over a range of 20 GHz or greater. The swept laser could be continuously swept. During DUT characterization, the local oscillator signal is typically swept across a range of wavelengths, or frequencies, in order to characterize the DUT over the range of wavelengths. In an embodiment, the sweep rate of the local oscillator signal at 1,550 nanometers is approximately 100 nm/s or 12.5 MHz/us and the sweep range is approximately 100 nm. However, the sweep rate and sweep range can be higher or lower. In one embodiment, sweeping the local oscillator signal across a range of wavelengths involves incrementally tuning the local oscillator signal in steps to different wavelengths with abrupt phase changes. In another embodiment in accordance with the invention, sweeping the local oscillator signal across a range of wavelengths involves a smooth transition between wavelengths, with smooth "accordion-like" phase changes.

The local oscillator source 102 is in optical communication with the optical splitter 104. In the embodiment of FIG. 1, a local oscillator fiber 126 optically connects the local oscillator source to the optical splitter. The optical splitter is also in optical communication with the test arm 106 and the reference arm 108 of the system 100. The optical splitter divides the local oscillator signal into test and reference portions, which are provided to the test and reference arms, respectively. The optical splitter may be an optical coupler that outputs the local oscillator signal into at least two optical paths. For example, the optical splitter may be an optically directional 3 dB fiber coupler, although other optical splitters may be utilized.

The test arm 106 includes test fibers 128, 130, and 132, a test signal modulator 134, and the DUT interface 112. The test arm optically connects the optical splitter 104 to the optical combining unit 114 such that the test portion of the local oscillator signal propagates from the optical splitter through the test signal modulator 134 and the DUT 120 to the optical combining unit. The test signal modulator modulates the test portion of the local oscillator signal to create a modulated test portion of the local oscillator signal. The test signal modulator may be a phase modulator, a polarization modulator, or an intensity modulator. In an embodiment, the modulator is a Ti-indiffused LiNbO$_3$ modulator. Signal modulation is described in more detail below.

The DUT interface 112 optically connects the DUT 120 to the system 100. In the configuration of FIG. 1, the DUT interface includes two connection points, which optically connect the DUT between the test signal modulator 134 and the optical combining unit 114. Specifically, the two connection points include two fiber optic connectors that enable fibers 130 and 132 to be coupled to ports of the DUT. Alternatively, the DUT interface may be any optical system or mechanism that enables the DUT to be optically connected between the test signal modulator and the optical combining unit. As described herein, the DUT interface is intended to include any optical system or mechanism that enables the DUT to be optically connected between the test signal modulator and the optical combining unit.

The DUT 120 may be an optical component such as a fiber, a filter, a multiplexer, a demultiplexer, a circulator etc., which is to be characterized. The DUT may also be an optical network that is made up of multiple optical components. Different DUTs can be connected to the system via the DUT interface. The DUT may be characterized in transmission or reflection depending on the particulars of the DUT.

The reference arm 108 of the system 100 includes reference fibers 136 and 138 and a reference signal modulator 140. The reference arm optically connects the optical splitter 104 to the optical combining unit 114 such that the reference portion of the local oscillator signal can propagate from the optical splitter through the reference signal modulator and to the optical combining unit. The reference signal modulator modulates the reference portion of the local oscillator signal to create a modulated reference portion of the local oscillator signal. The reference signal modulator may be a phase modulator, a polarization modulator, or an intensity modulator. In an embodiment, the modulator is a Ti-indiffused LiNbO$_3$ modulator. Signal modulation is described in more detail below.

The modulation controller 110 is in signal communication with both the test signal and reference signal modulators 134 and 140. The modulation controller provides modulation signals to the modulators, which control the optical signal modulation. For example, the modulation controller provides a modulation signal at frequency $f_1$ to the test signal modulator and a modulation signal at frequency $f_2$ to the reference signal modulator, where the modulation frequencies $f_1$ and $f_2$ differ from each other. In an embodiment, the modulation frequencies are selected such that the frequency difference between the two modulated signals is within the bandwidth of the optical receiver. Inputs to the modulation controller can be made through a test system user interface (not shown). The modulation controller may also provide an electrical reference signal (e.g., at the frequency difference $f_1-f_2$) to the processing unit 118 via connection 117.

The optical combining unit 114 is in optical communication with the local oscillator source 102 via the test and reference arms 106 and 108 of the system 100. In the embodiment of FIG. 1, the optical combining unit is connected to the test and reference arms by fibers 132 and 138, respectively. The optical combining unit optically combines the modulated test portion of the local oscillator signal and the modulated reference portion of the local oscillator signal into a combined optical signal and outputs at least one portion of the combined optical signal to the optical receiver 116 via output fiber 142. The optical combining unit may be an optical coupler that outputs the combined optical signal into at least one optical path. For example, the optical coupler may be an optically directional 3 dB fiber coupler, although other optical couplers may be utilized. In an embodiment in accordance with the invention, coupling of the optical signals is substantially independent of the polarization of optical signals. In an embodiment, the polarization states of the optical signals are controlled (e.g., using polarization controllers) to be nearly the same so as to maximize the heterodyne beat signal. Although the optical combining unit is described below as outputting one beam of the combined optical signal to the optical receiver 116, it should be understood that embodiments of the optical combining unit that output more than one beam of the combined optical signal (e.g., a balanced receiver) are possible.

The optical receiver 116 includes at least one photodetector that is aligned to detect and mix the combined optical signal that is output from the optical combining unit. The optical receiver generates electrical signals in response to the received optical signal. The electrical signals generated by the optical receiver are provided to the processing unit 118 for use in characterizing the DUT. The connection between the optical receiver and the processing unit is depicted in FIG. 1 by line 148. Although not shown, the optical receiver may include additional signal processing circuitry such as signal amplifiers, filters, and signal combiners as is known in the field. The optical receiver may also include polarization selective optics to permit polarization diverse reception and/or polarization analysis of the input signal.

The processing unit 118 receives electrical signals from the optical receiver 116 and processes the electrical signals to determine at least one optical characteristic of the DUT 120. In particular, the processing unit can determine the amplitude, phase, and group delay response of the DUT. The processing unit may include analog signal processing circuitry and/or digital signal processing circuitry as is known in the field of electrical signal processing. In an embodiment, an analog signal from the optical receiver is converted into digital data and the digital data is subsequently processed. The processing unit may also include any combination of hardware and software based processing.

In the system 100 of FIG. 1, the optical fibers that optically connect the various optical components are single mode optical fibers as is known in the art, although other waveguides may be utilized to optically connect the various optical components. In addition, although waveguides are described, optical signals may be input into the system, or transmitted within the system, in free space.

Operation of the system 100 described with reference to FIG. 1 involves generating a local oscillator signal that is swept across a range of wavelengths and dividing the local oscillator signal into test and reference portions. The test portion of the local oscillator signal is modulated by the test signal modulator 134 and then provided to the DUT 120 while the reference portion of the local oscillator signal is modulated by the reference signal modulator 140. As is described in detail below, the modulation frequencies imparted on the test and reference portions of the local oscillator signal differ from each other. The two modulated portions of the local oscillator signal are combined at the optical combining unit 114 to generate a combined optical signal. The combined optical signal is detected and mixed by the optical receiver 116. Electrical signals generated by the optical receiver are received by the processor 118 and processed to determine at least one optical characteristic of the DUT. In particular, the amplitude, phase, and group delay response of the DUT are determined from the received optical signal. The combination of the optical splitter, the test signal modulator, the reference signal modulator, the optical combining unit, and the optical receiver creates a system that has a wide dynamic range due to its heterodyne nature (where the photodetector current is proportional to a product of a strong local oscillator reference signal electrical field and a test signal electrical field). Measurement of the group delay is made using the modulation sidebands and for practical purposes, is insensitive to environmental and physical instabilities.

Group Delay Measurement Through Phase Modulation

Figure 2A:
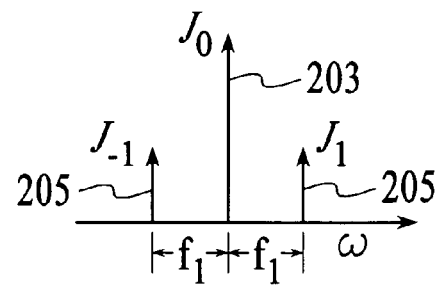
FIG. 2A depicts the spectral peaks of a phase modulated test portion of the local oscillator signal.
Figure 2B:
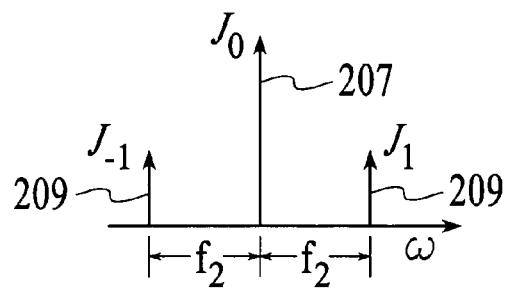
FIG. 2B depicts the spectral peaks of a phase modulated reference portion of the local oscillator signal.

In an embodiment in accordance with the invention, the group delay of a DUT is measured through phase modulating the test and reference portions of the local oscillator signal at different frequencies. In particular, the group delay is determined from the phase difference between the modulation sidebands of the optical test signal. The phase difference at optical frequencies is translated down to the electrical frequency by mixing the modulated test portion of the local oscillator signal with the modulated reference portion of the local oscillator signal. Therefore, the phase difference is measured at the electrical frequency of $f_1-f_2$. In the system 100 of FIG. 1, both the test signal and reference signal modulators 134 and 140 are phase modulators, such as Ti-indiffused $LiNbO_3$ phase modulators. As depicted in FIG. 2A, phase modulating the test portion of the local oscillator signal at a modulation frequency of $f_1$ produces an optical signal with a central spectral peak 203 at the carrier frequency and multiple sideband spectral peaks 205 (referred to herein as sidebands) spaced apart at intervals of $f_1$. Likewise, as depicted in FIG. 2B, phase modulating the reference portion of the local oscillator signal at a modulation frequency of $f_2$ produces an optical signal with a central spectral peak 207 at the carrier frequency and multiple sidebands spaced apart at intervals of $f_2$. Referring back to FIG. 1, the phase modulated test portion of the local oscillator signal is provided to the DUT 120 via the DUT interface 112. The phase modulated test portion of the local oscillator signal and the phase modulated reference portion of the local oscillator signal are then combined at the optical combining unit 114 to form a combined optical signal. The combined optical signal is detected and mixed at the optical receiver 116.

In an embodiment, the receiver bandwidth is limited such that only the corresponding sidebands of the test and reference signals are mixed. In particular, the $J_{-1}$ sideband 205 depicted in FIG. 2A is mixed with the $J_{-1}$ sideband 209 depicted in FIG. 2B giving rise to an electrical signal. Similarly, the $J_1$ sideband 205 depicted in FIG. 2A is mixed with the $J_1$ sideband 209 depicted in FIG. 2B also giving rise to an electrical signal. The process of mixing and forming electrical signals takes place in the optical receiver 116. Furthermore, the two electrical signals create a beat signal within the optical receiver. It is known that two acoustic waves at different frequencies will pulse or "beat" at a frequency that is equal to the difference between the frequencies of the two acoustic waves. As an example, two acoustic waves at 30 Hertz (Hz) and 34 Hz will produce a beat frequency of 4 Hz. The phase of the beat contains information about the phase difference between the two acoustic waves. This beat phenomenon also occurs for the electrical signals that are generated at the receiver, and thus, the beat of the electrical signals contains phase information related to the two optical signals. Since the phase information is preserved in a heterodyne signal, which is produced by combining and mixing the respective sidebands of the two modulated portions of the local oscillator signal, the phase of the electrical beat contains the phase difference information of the optical sidebands propagated through the DUT. Thus the phase information contained in the beat of the heterodyne signals can be extracted to measure the phase difference between the two sidebands of the modulated test portion of the local oscillator signal. The group delay is determined directly from the phase difference divided by the modulation sideband separation, which is equal to $\Delta\omega=4\pi f_1$. The group delay is represented in equation form as:

$$\tau_g = \frac{-\Delta\varphi}{\Delta\omega}$$

where $\Delta\phi$ denotes the measured phase difference.

Group Delay Measurement Principles

The following is a description of the principles involved in measuring the group delay using the combination of an interferometry-based system and signal modulation. The below-provided description relates to the system described with reference to FIG. 1. To simplify the mathematical notation, it is assumed that the local oscillator signal is at a constant optical frequency, as represented by $v_0$. The electrical field amplitude of the local oscillator signal is normalized to one and expressed by $e_0(t)=\exp(j2\pi v_0 t+j\phi_0)$, where the phase term, $\phi_0$, represents the phase noise. The phase term, $\phi_0$, could also contain the optical phase changes due to the local oscillator signal sweep. In the test arm, the local oscillator signal is phase modulated at the modulation depth $a_1$ and at the electrical frequency $f_1$. Thus, after the test signal modulator, the electrical field of the modulated local oscillator signal is expressed by the equation:

$$e_1(t)=\exp(j2\pi v_0 t+j\phi_0+ja_1 \cos(2\pi f_1 t+\psi_1)), \quad (1)$$

where $\psi_1$ represents the electrical phase noise of the signal applied to the phase modulator. By using the Jacobi-Anger expansion:

$$\exp(ja\cos\theta) = \sum_{m=-\infty}^{\infty} j^m J_m(a)\exp(jm\theta), \quad (2)$$

where $J_m(a)$ represent Bessel functions, and capturing only the carrier and two nearest sidebands, the equation (1) can be rewritten as $$e_1(t) = \quad (3)$$
$$jJ_1(a_1)\exp(j2\pi v_0 t - j2\pi f_1 t + j\varphi_0 - j\psi_1) + J_0(a_1)\exp(j2\pi v_0 t + j\varphi_0) +$$
$$jJ_1(a_1)\exp(j2\pi v_0 t + j2\pi f_1 t + j\varphi_0 + j\psi_1) + \cdots$$

The multiple sidebands of the modulated local oscillator signal can be looked at as multiple optical waves whose phases are locked. Each of these waves has a different optical frequency and propagates with a different velocity through a dispersive DUT. Thus, each optical wave from equation (3) experiences a different phase shift. In addition, for a swept local oscillator signal, all optical waves are shifted in frequency by $\gamma\tau$, where $\gamma$ is the local oscillator signal sweep rate and $\tau$ is the delay due to the imbalance of the interferometer which includes the delay of the DUT. The equation for the electric field that accounts for the dispersion and the local oscillator signal sweep is:

$$e'_1(t) = jJ_1(a_1)\exp(j2\pi v_0 t - j2\pi f_1 t - j\pi\gamma\tau t + j\varphi_0 - j\psi_1 - j\theta_{-1}) + \quad (4)$$
$$J_0(a_1)\exp(j2\pi v_0 t - j\pi\gamma\tau t + j\varphi_0 - j\theta_0) +$$
$$jJ_1(a_1)\exp(j2\pi v_0 t + j2\pi f_1 t - j\pi\gamma\tau t + j\varphi_0 + j\psi_1 - j\theta_1) + \cdots$$

where $\theta_m$ denote the dispersion related phase shifts.

The portion of the local oscillator in the reference arm of the system of FIG. 1 can be described in a similar manner. The phase modulation frequency $f_2$ is selected so that the frequency difference between the two modulated signals, $f_1-f_2$, is within the bandwidth of the optical receiver. The equation for the electrical field is:

$$e_2(t)=\exp(j2\pi v_0 t+j\phi_0+ja_2 \cos(2\pi f_2 t+\psi_2)) \quad (5)$$

where $\alpha_2$ is the modulation depth and $\psi_2$ represents the phase noise of the electrical signal applied to the phase modulator. From Jacobi-Anger expansion (2):

$$e_2(t) = \quad (6)$$
$$jJ_1(a_2)\exp(j2\pi v_0 t - j2\pi f_2 t + j\varphi_0 - j\psi_2) + J_0(a_2)\exp(j2\pi v_0 t + j\varphi_0) +$$
$$jJ_1(a_2)\exp(j2\pi v_0 t + j2\pi f_2 t + j\varphi_0 + j\psi_2) + \cdots$$

Figure 3A:
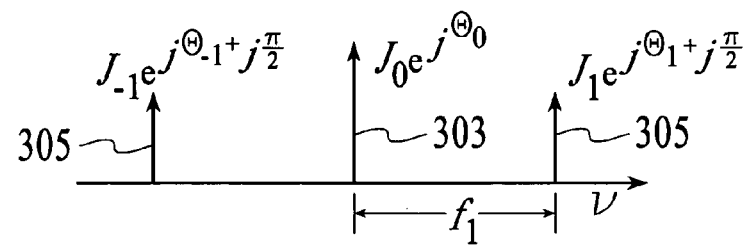
FIG. 3A depicts the spectral peaks and associated electrical fields of a modulated test portion of the local oscillator signal in the optical domain.
Figure 3B:
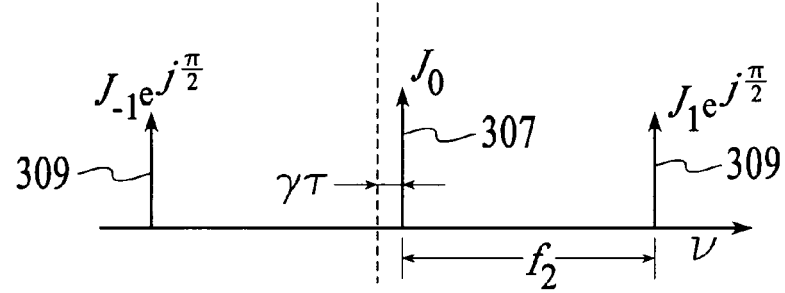
FIG. 3B depicts the spectral peaks and associated electrical fields of a modulated reference portion of the local oscillator signal in the optical domain.
Figure 3C:
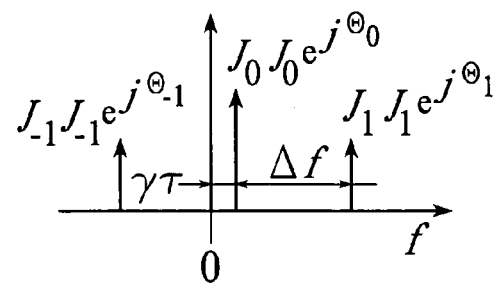
FIG. 3C depicts the spectral peaks, in the electrical domain, of the electrical photodetector current that is generated in response to the electrical fields of the test and reference portions of the local oscillator signal after mixing.

The intensity at the photodetector of the optical receiver is calculated from the equation $I=(e'_1+e_2)(e'_1+e_2)^*$. Only the interference term with frequencies that are within the receiver bandwidth are considered (e.g., only the interference of the corresponding sidebands from the equations (4) and (6)). In an embodiment in accordance with the invention, the bandwidth of the optical receiver is selected such that the optical receiver detects the low frequency interference signals but does not detect other higher frequency interference signals. Assuming for simplicity that the detector responsivity is equal to one, and that only alternating current (AC) terms are measured, the current at the photodetector of the optical receiver is:

$$i(t) = 2J_1(a_1)J_1(a_2)\cos(2\pi\Delta f t + 2\pi\gamma\tau t + \theta_{-1} + \psi_1 - \psi_2) + \quad (7)$$
$$2J_0(a_1)J_0(a_2)\cos(2\pi\gamma\tau t + \theta_0) +$$
$$2J_1(a_1)J_1(a_2)\cos(2\pi\Delta f t - 2\pi\gamma\tau t - \theta_1 + \psi_1 - \psi_2) + \cdots$$

where $\Delta f=f_1-f_2$. Equations (4), (6) and (7) are graphically illustrated in FIGS. 3A–3C. In particular, FIG. 3A identifies the electrical fields of the modulated test portion of the local oscillator signal in the optical domain, FIG. 3B identifies the electrical fields of the modulated reference portion of the local oscillator signal in the optical domain, and FIG. 3C identifies, in the electrical domain, the electrical current that results from mixing the modulated test and reference portions of the local oscillator signal. The current at the electrical frequency $\Delta f$ expressed in a product form is:

$$i(t)=4J_1(a_1)J_1(a_2)\cos(2\pi\gamma\tau t+\theta_0)\cos(2\pi\Delta f t+\Delta\theta+\psi_1-\psi_2), \quad (8)$$

where $\theta_0=(\theta_{-1}+\theta_1)/2$ and $\Delta\theta=(\theta_{-1}-\theta_1)/2$. The above equation describes an amplitude modulated (AM) signal. In the case where $\Delta f > \gamma\tau$, the carrier frequency is $\Delta f$ and the AM frequency is $\gamma\tau$. The AM signal $\cos(2\pi\gamma\tau t+\theta_0)$ represents a traditionally measured signal in the interferometric heterodyne optical network analyzer. The phase shift $\theta_0$ of this signal provides a measure of dispersion. The sensitivity of this traditional method to thermal and vibrational instabilities originates in the dependence of the interferometer imbalance $\tau$ on thermal and vibrational effects. Additionally, the measurement is sensitive to the variations of the sweep rate $\gamma$.

The carrier signal $\cos(2\pi\Delta ft+\Delta\theta+\psi_1-\psi_2)$ provides new means of dispersion measurement. Unlike the frequency of the interferometric signal $\gamma\tau$, the frequency $\Delta f$ is constant and independent of variations in the environment and variations in the sweep rate of the local oscillator signal. The phase shift, $\Delta\theta$, contains the dispersion effects and it is measured between the sidebands $J_{-1}$ and $J_1$. The group delay can be calculated from the equation:

$$\tau_g \approx \frac{\Delta\theta}{\Delta\omega} \qquad (9)$$

where $\Delta\omega=2\pi f$ and $f \approx f_{1,2}$. The precision of the group delay measurement is a function of the electrical phase noise contained in the phase term $\psi_1-\psi_2$, thus modulation controller 110 from FIG. 1 has to have a low electrical phase noise. It should be noted that the signal that is traditionally used in the heterodyne optical network analyzers is preserved and available for processing.

In the case where by $\Delta f<\gamma\tau$ (e.g., either a DUT with very long leads or very fast local oscillator signal sweep rate), the signal $\cos(2\pi\gamma\tau t+\theta_0)$ acts as a carrier while $\cos(2\pi\Delta ft+\Delta\theta+\psi_1-\psi_2)$ describes its amplitude modulation. In this scenario, the interferometric measurement is either very difficult or impossible due to high environmental instabilities and high frequency $\gamma\tau$. However, the AM signal $\cos(2\pi\Delta ft+\Delta\theta+\psi_1-\psi_2)$ of this method can be detected through traditional methods of AM demodulation (e.g., mixing or peak detection), and the phase shift $\Delta\theta$ can be measured. Thus, the described technique allows for the group delay measurements of long DUTs. This is another advantage of this technique over a traditional inteferometric heterodyne network analyzer.

The key formulae in this section were derived for the nearest sidebands $J_{-1}$ and $J_1$. However, the key formulae can be easily generalized to an arbitrary pair of sidebands. Higher order sidebands can be used when considering polarization resolved measurements that involve multiple sidebands having different polarization states. Also, higher order sidebands can be used in the measurements of long DUTs.

Differential Group Delay Measurement Through Polarization Modulation

Figure 4:
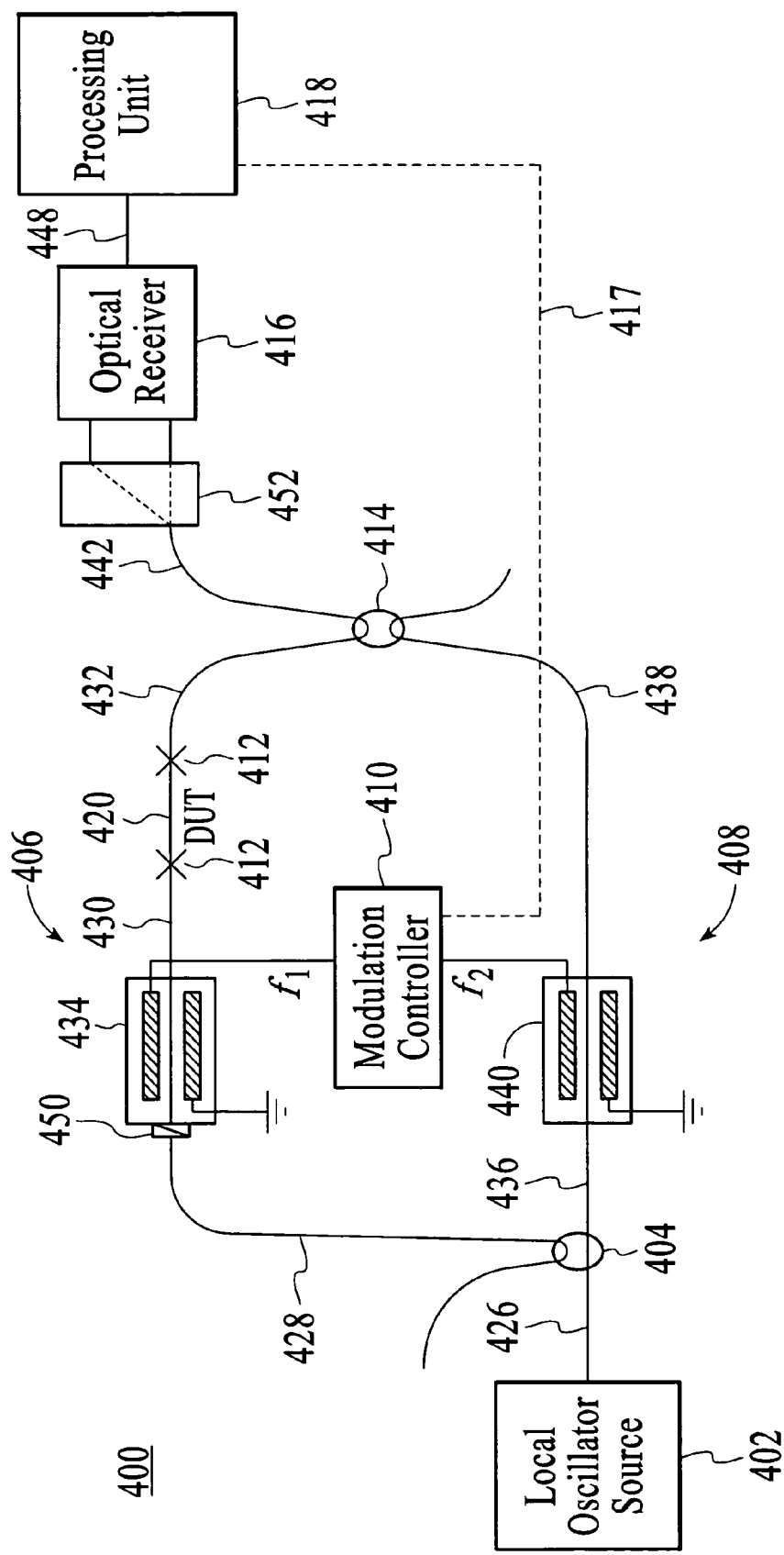
FIG. 4 depicts an embodiment in accordance with the invention of a system for measuring polarization characteristics of a DUT that utilizes polarization modulation in the test arm.
Figure 5A:
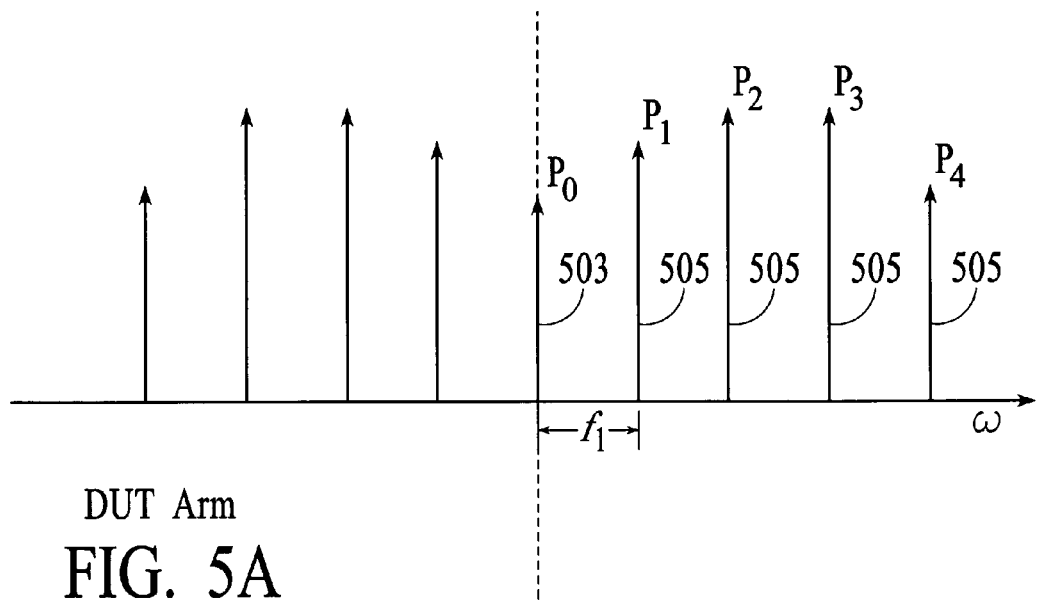
FIG. 5A depicts the spectral peaks of a polarization modulated test portion of the local oscillator signal.
Figure 5B:
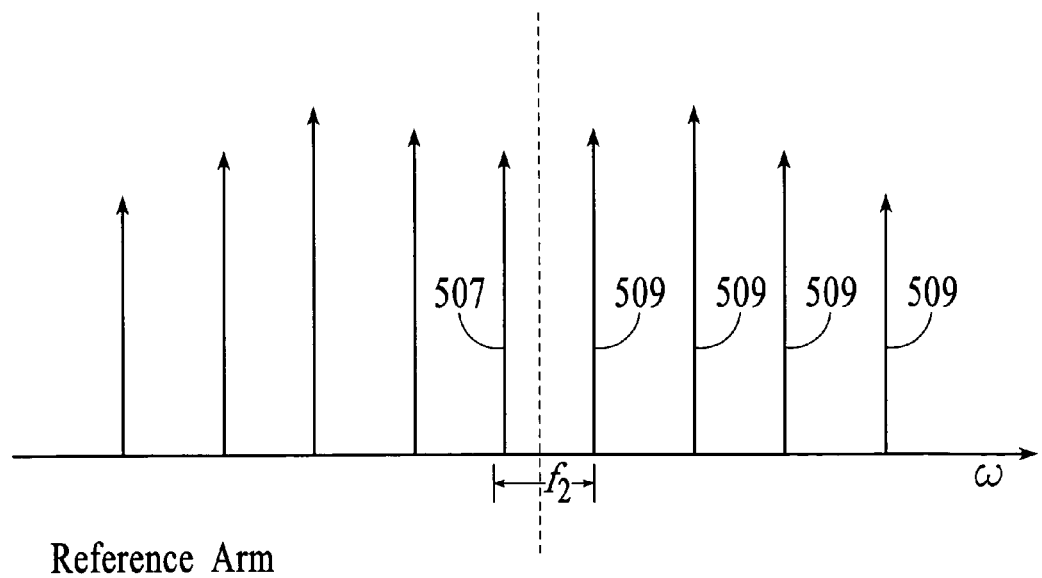
FIG. 5B depicts the spectral peaks of a phase or polarization modulated reference portion of the local oscillator signal.

In an embodiment in accordance with the invention, polarization dependent characteristics (including differential group delay) of a DUT are measured through polarization modulation of the test portion of the local oscillator signal. FIG. 4 depicts a system 400 that is used to measure the polarization dependent characteristics (including differential group delay) of a DUT. The system of FIG. 4 is similar to the system of FIG. 1 except that the test signal modulator 434 in the system of FIG. 4 is a polarization modulator and the optical receiver 416 is a polarization diverse receiver. With reference to FIG. 4, a polarizing beam splitter 452 is located in an optical path between the optical combining unit 414 and the optical receiver 416. The optical receiver includes one photodetector for each of the two polarized beams that are output from the polarizing beam splitter. The polarizing beam splitter and multiple photodetectors enable the optical receiver to be a polarization diverse receiver as is known in the field. The polarization modulator 434 includes a polarizer 450 at the input of a Ti-indiffused LiNbO$_3$ phase modulator. Thus, polarization modulation is achieved by launching a linearly polarized local oscillator signal into the birefringent element at 45 degrees to equalize the power of two linear polarization modes. Each polarization mode of the local oscillator signal experiences a different phase modulation due to a different value of electro-optic coefficient. As depicted in FIG. 5A, polarization modulating the test portion of the local oscillator signal produces an optical signal with a central spectral peak 503 at the carrier frequency and multiple sideband spectral peaks 505 spaced apart at intervals of $f_1$. As a result of the polarization modulation, each of the spectral peaks has a different polarization state (e.g., $P_0$, $P_1$, $P_2$, $P_3$, and $P_4$). The reference portion of the local oscillator signal is phase or polarization modulated to produce an optical signal with a central spectral peak 507 at the carrier frequency and multiple sidebands 509 spaced apart at frequency intervals of $f_2$ as depicted in FIG. 5B. The offset between the frequencies of the two modulated signals corresponds to the free spectral range of the interferometer and is equal to $\tau$. Thus, the offset between FIGS. 5A and 5B represents the measurement scenario when the difference in modulation frequencies $\Delta f=f_1-f_2$ is smaller than $\tau$ (e.g., the case of a short DUT or a slow sweep rate).

In operation, the polarization modulated test portion of the local oscillator signal is provided to the DUT 420 via the DUT interface 412. The polarization modulated test portion of the local oscillator signal and the modulated reference portion of the local oscillator signal are then combined at the optical combining unit 414 to form a combined optical signal. The combined optical signal is then detected and mixed at the optical receiver 416. Mixing of the polarization modulated test portion of the local oscillator signal with the modulated reference portion of the local oscillator signal translates the optical frequencies down to desired electrical frequencies. The phase difference between spectral peaks of the polarization modulated test portion of the local oscillator signal can then be determined from the corresponding frequency translated electrical signals and used to measure polarization dependent properties, such as differential group delay. The amplitude of the detected signal can be used to determine polarization state dependent amplitude responses, such as polarization dependent loss. The differential group delay is determined directly from the phase shifts between different sets of modulation sidebands having different polarization states.

Differential Group Delay Measurement Principles

The following is a description of the principles involved in measuring polarization dependent characteristics (including differential group delay) of a DUT with an interferometer-based system and polarization modulation.

Polarization Modulation

A polarization modulator, which includes the modulator 434 and the polarizer 450, is depicted in FIG. 4. The polarization modulator is a device that modulates two polarization modes differently, and thus, modulates the polarization state. A polarization modulator can be realized, for example, using the polarizer and a Ti-indiffused LiNbO$_3$ phase modulator. The local oscillator signal is launched through the polarizer in a linear polarization state into the Ti-indiffused LiNbO$_3$ phase modulator at 45° to equalize the power of two linear polarization modes of the modulator.

Each polarization mode experiences different phase modulation due to a different value of the electro-optic coefficient ($r_{33} \approx 3r_{13}$). Mathematically, using the Jones vector notation, the electric field of a polarization modulated optical wave is described by the following equation:

$$e_1(t) = \exp(j2\pi v_0 t + j\varphi_0) \begin{pmatrix} \exp(ja_1 \cos(2\pi f_1 t + \psi_1)) \\ \exp(jb_1 \cos(2\pi f_1 t + \psi_1)) \end{pmatrix}, \quad (10)$$

where $a_1 \approx 3b_1$. Using Jacobi-Anger expansion (5), the following expression is obtained:

$$e_1(t) = \sum_{m=-\infty}^{\infty} j^m \exp(j2\pi(v_0 + mf_1)t + j\varphi_0 + jm\psi_1) \begin{pmatrix} J_m(a_1) \\ J_m(b_1) \end{pmatrix}. \quad (11)$$

Thus, the optical waves at the optical frequencies $v_0 \pm mf_1$ have polarization states described by the Jones vectors $$\begin{pmatrix} J_m(a_1) \\ J_m(b_1) \end{pmatrix}.$$

Figure 6:
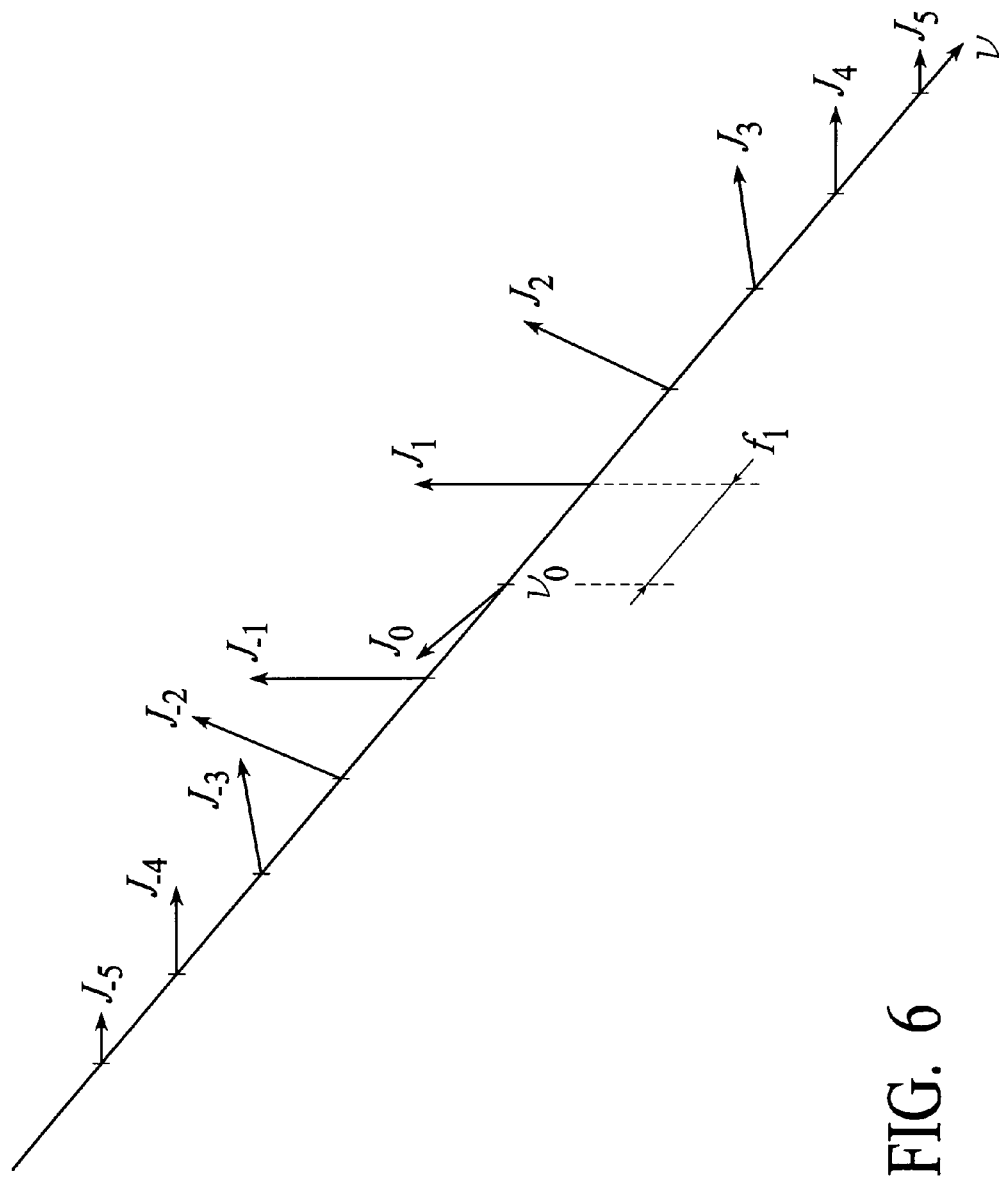
FIG. 6 is a three-dimensional depiction of a polarization modulated local oscillator signal.

Since $J_m(a_1)$ and $J_m(b_1)$ are real, the corresponding polarization states are linear and distributed along the equator on the Poincare sphere. By adjusting the modulation depth to $a_1 \approx 3b_1$, it is possible to control the azimuth of the individual linear polarization states. A representation of the different polarization states of the sidebands is shown is FIG. 6, where multiple spectral peaks (spaced apart by the modulation frequency $f_1$) of the modulated local oscillator signal have different linear polarization states. A particularly interesting arrangement is that of making polarization states of two different sidebands orthogonal or nearly orthogonal. For example, by enforcing $J_1(a_1)J_3(a_1) + J_1(b_1)J_3(b_1) = 0$ the optical waves having the optical frequencies $v_0 \pm f_1$ and $v_0 \pm 3f_1$ have orthogonal polarization states. Furthermore, these optical waves can be detected at different electrical frequencies as shown in the next section. This allows for simultaneous measurement of the DUT at two or more polarization states. The simultaneous measurements can be used to determine polarization properties of the DUT, such as differential group delay or polarization dependent loss.

Polarization Resolved Measurements

Assume that the polarization modulated test portion of the local oscillator signal propagates through a DUT that is described by a Jones matrix M. The elements of the matrix M are assumed to have a constant amplitude over the spectral width of the modulated local oscillator signal. That is, the matrix elements have the same amplitude for the sidebands comprising the modulated local oscillator signal (three to four sidebands). However, the phase of the elements varies from sideband to sideband which is denoted by an index m:

$$M_m = \begin{pmatrix} a\exp(j\alpha_m) & b\exp(j\beta_m) \\ c\exp(j\gamma_m) & d\exp(j\sigma_m) \end{pmatrix} \quad (12)$$

In addition, the optical wave in the test arm experiences a frequency shift $\gamma\tau$. By multiplying equations (11) and (12) and accounting for the additional phase shift, an expression for the electrical field after propagation through the DUT is obtained:

$$e'_1(t) = \sum_{m=-3}^{3} j^m \exp(j2\pi(v_0 + mf_1)t - j2\pi\gamma\tau t + j\varphi_0 + jm\psi_1) \quad (13)$$

$$\begin{pmatrix} aJ_m(a_1)\exp(j\alpha_m) + bJ_m(b_1)\exp(j\beta_m) \\ cJ(a_1)\exp(j\gamma_m) + dJ_m(b_1)\exp(j\sigma_m) \end{pmatrix}$$

Figure 7:
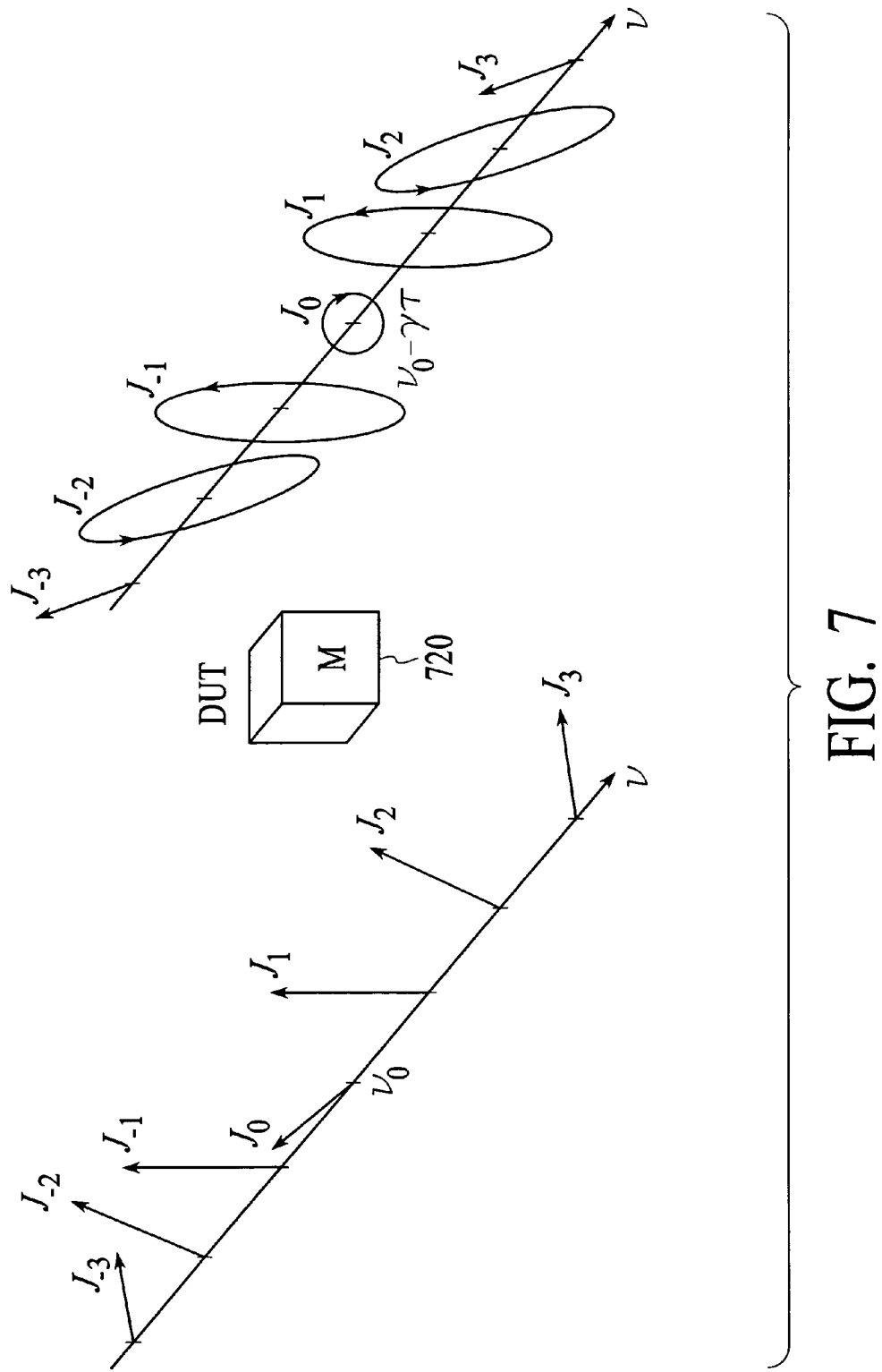
FIG. 7 depicts, in three-dimensions, the polarization state of a polarization modulated local oscillator signal before and after propagation through a DUT.

The above expression considers only the three sidebands. Propagation of the optical wave through the DUT is illustrated in FIG. 7. In particular, FIG. 7 illustrates the polarization states of the polarization modulated signal before it is applied to the DUT 720 and after it is applied to the DUT. Only three sidebands from equation (13) are shown on each side of the carrier. As shown in FIG. 4, the optical receiver is polarization diverse, therefore, the polarization state of the local oscillator signal in the reference arm is selected to provide equal power at two photodetectors of the optical receiver. Equal power is provided when the angle $\alpha$ in the Jones vector $$\begin{pmatrix} \cos(\alpha) \\ \exp(j\zeta)\sin(\alpha) \end{pmatrix},$$

that describes an arbitrary polarization state, is approximately equal to $\pi/4$. When accounting for the polarization state and using the Jacobi-Anger expansion (2), the equation (5), which describes the local oscillator signal in the reference arm, becomes:

$$e_2(t) = \sum_{m=-3}^{3} j^m \exp(j2\pi(v_0 + mf_2)t + j\varphi_0 + jm\psi_2) J_m(a_2) \begin{pmatrix} 1 \\ \exp(j\zeta) \end{pmatrix}. \quad (14)$$

The wave $e'_1(t)$ from the test arm 406 and $e_2(t)$ from the reference arm 408 are combined in the optical combining unit 414. The resulting electrical field $e(t) = e'_1(t) + e_2(t)$ is detected in the polarization diverse receiver 416. Thus, the horizontal and vertical linear polarization components that correspond to the upper and to the lower element of the resulting Jones vector are detected separately. Mathematically, the horizontal component is defined by $e_h(t) = P_h e(t)$ and the vertical component is defined by $e_v(t) = P_v e(t)$, where $$P_v = \begin{pmatrix} 1 & 0 \\ 0 & 0 \end{pmatrix} \text{ and } P_v = \begin{pmatrix} 0 & 0 \\ 0 & 1 \end{pmatrix}.$$

Assuming that the responsivity of the receiver photodetectors is equal to one, the current produced from the horizontal polarization state is calculated from the equation $i_h(t) = e_h(t) e_h(t)^*$ and is equal to:

$$i_h(t) = \sum_{m=-3}^{3} (aJ_m(a_1)J_m(a_2)\cos(2\pi m\Delta ft - 2\pi\gamma\tau t + m\Delta\psi + \alpha_m) + \quad (15)$$

$$bJ_m(b_1)J_m(a_2)\cos(2\pi m\Delta ft - 2\pi\gamma\tau t + m\Delta\psi + \beta_m))$$

where $\Delta f = f_1 - f_2$ and $\Delta\psi = \psi_1 - \psi_2$. The above equation lists only the AC terms that are detected and processed in the measurement system. Similarly, for the vertical polarization state $i_v(t) = e_v(t)e_v(t)^*$ gives:

$$i_v(t) = \sum_{m=-3}^{3} (cJ_m(a_1)J_m(a_2)\cos(2\pi m\Delta ft - 2\pi\gamma\tau t + m\Delta\psi + \gamma_m) + \quad (16)$$

$$dJ_m(b_1)J_m(a_2)\cos(2\pi m\Delta ft - 2\pi\gamma\tau t + m\Delta\psi + \sigma_m))$$

Figure 8:
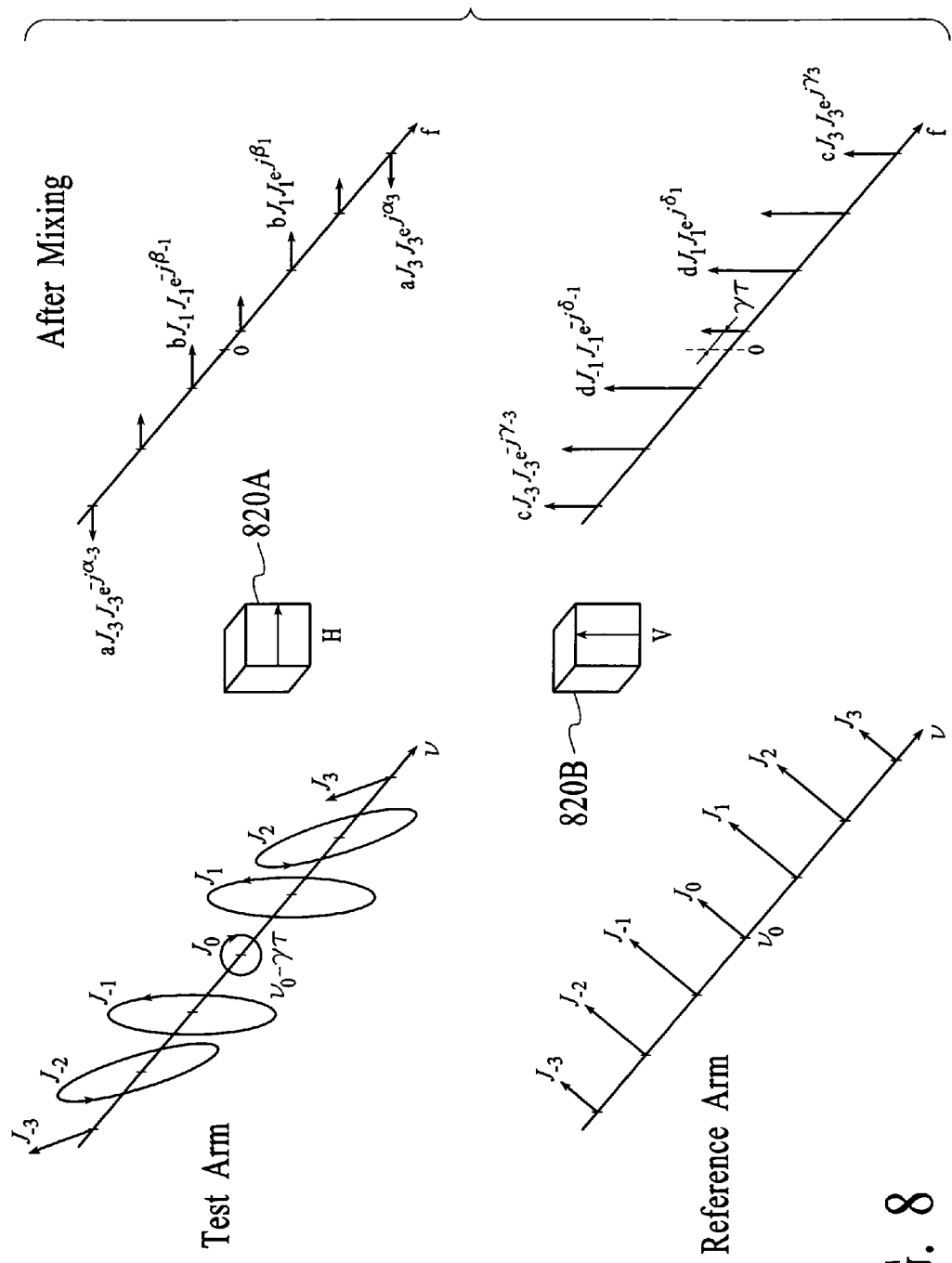
FIG. 8 depicts, in three-dimensions, the recovery of Jones matrix elements from the mixing of a polarization modulated test portion of a local oscillator signal and a phase modulated reference portion of the local oscillator signal.

It is now assumed that the input polarization state from the phase modulator at the optical frequencies $v_0 \pm f_1$ is forced to be vertical by adjusting the modulation depth so that $J_1(a_1) = 0$. Since the modulation depth $b_1$ is about three times smaller $J_3(b_1) \approx 0$. Therefore, the optical frequencies $v_0 \pm 3f_1$ are in the nearly horizontal polarization state. By detecting the first sideband at the frequency $\Delta f$ and the third sideband at the frequency $3\Delta f$, the response of the DUT is measured for the nearly orthogonal polarization states. The DUT response to the horizontal polarization state excitation measured in the horizontal polarization state of the optical receiver is found from equation (15) from the third harmonic:

$$i_{h_3}(t) = 2aJ_3(a_1)J_3(a_2)\cos(2\pi\gamma\tau t - \alpha_0)\cos(6\pi\Delta ft + 3\Delta\psi + \Delta\alpha_3), \quad (17)$$

where $\alpha_0 = (\alpha_3 + \alpha_{-3})/2$ and $\Delta\alpha_3 = (\alpha_3 - \alpha_{-3})/2$. Similarly, the DUT response to the vertical polarization state excitation measured in the horizontal polarization state is found from equation (15) from the first harmonic:

$$i_{h_1}(t) = 2bJ_1(b_1)J_1(a_2)\cos(2\pi\gamma\tau t - \beta_0)\cos(2\pi\Delta ft + \Delta\psi + \Delta\beta_1), \quad (18)$$

where $\beta_0 = (\beta_1 + \beta_{-1})/2$ and $\Delta\beta_1 = (\beta_1 - \beta_{-1})/2$. Using the same procedure, the DUT response to the horizontal polarization state excitation measured in the vertical polarization of the receiver is found from equation (16) from the third harmonic:

$$i_{v_3}(t) = 2cJ_3(a_1)J_3(a_2)\cos(2\pi\gamma\tau t + \zeta - \gamma_0)\cos(6\pi\Delta ft + 3\Delta\psi + \Delta\gamma_3), \quad (19)$$

where $\gamma_0 = (\gamma_3 + \gamma_{-3})/2$ and $\Delta\gamma_3 = (\gamma_3 - \gamma_{-3})/2$. Finally, the DUT response to the vertical polarization state excitation measured in the vertical polarization of the optical receiver is found from equation (16) from the first harmonic:

$$i_{v_1}(t) = 2dJ_1(b_1)J_1(a_2)\cos(2\pi\gamma\tau t + \zeta - \sigma_0)\cos(2\pi\Delta ft + \Delta\psi + \Delta\sigma_1), \quad (20)$$

where $\sigma_0 = (\sigma_1 + \sigma_{-1})/2$ and $\Delta\sigma_1 = (\sigma_1 - \sigma_{-1})/2$. Equations (13), (14), and the mixing process that leads to the equations (17)–(20) are illustrated graphically in FIG. 8. In particular, the left side of FIG. 8 depicts the polarization states of the modulated test and reference portions of the local oscillator signal after the test portion has been applied to the DUT but before the two signals have been combined and mixed. The right side of FIG. 8 depicts separately the horizontal and vertical components of the mixed signals. Equations (17)–(20) describe signals that have the same properties as the signal described by equation (8). Therefore, the possible measurement approaches are analogous. It is possible to measure the interferometric signals at the electrical frequency $\gamma\tau$ to determine the phase terms $\alpha$, $\beta$, $\gamma$, and $\sigma$ of the Jones matrix (12). This traditional measurement is sensitive to thermal instabilities and vibration. Alternatively, in accordance with the invention, a differential measurement of phase differences $\Delta\alpha$, $\Delta\beta$, $\Delta\gamma$, and $\Delta\sigma$ at the frequencies $\Delta f$ and $3\Delta f$ constitutes an environmentally insensitive technique. The phase terms are found from the phase differences by integration. The amplitudes a, b, c, and d are determined in either method from the strength of the detected signals. Thus, in either method the Jones matrix (12) can be reconstructed. It is important to mention that typically it is sufficient to reconstruct the normalized Jones matrix with some of its elements set to constants (e.g., d=1 and $\sigma_0 = 0$). This implies the relative measurement of amplitude and phase (e.g., a/d and $\alpha - \sigma$). Any constant offset in phase is of no consequence. This is why the phase shift $\zeta$ in equations (19) and (20), or the integration process, have no effect on the differential group delay determined, for example, from eigen analysis. Note also that the differential phase measurements allow for characterization of a DUT having long leads (e.g., the dispersion measurement of a spool of fiber). The measurement of components with long leads is very difficult or impossible when using known inteferometric methods. The solution given above is not the only solution, however, it is relatively simple. In general, the use of orthogonal polarization states is not required. Furthermore, only two sidebands having orthogonal polarization states were used in the analysis. Use of the additional sidebands having other polarization states may add in improving the accuracy of the measurement or in calibration. The description of more complicated measurement scenarios was excluded from this description to avoid mathematical complexity.

Figure 9:
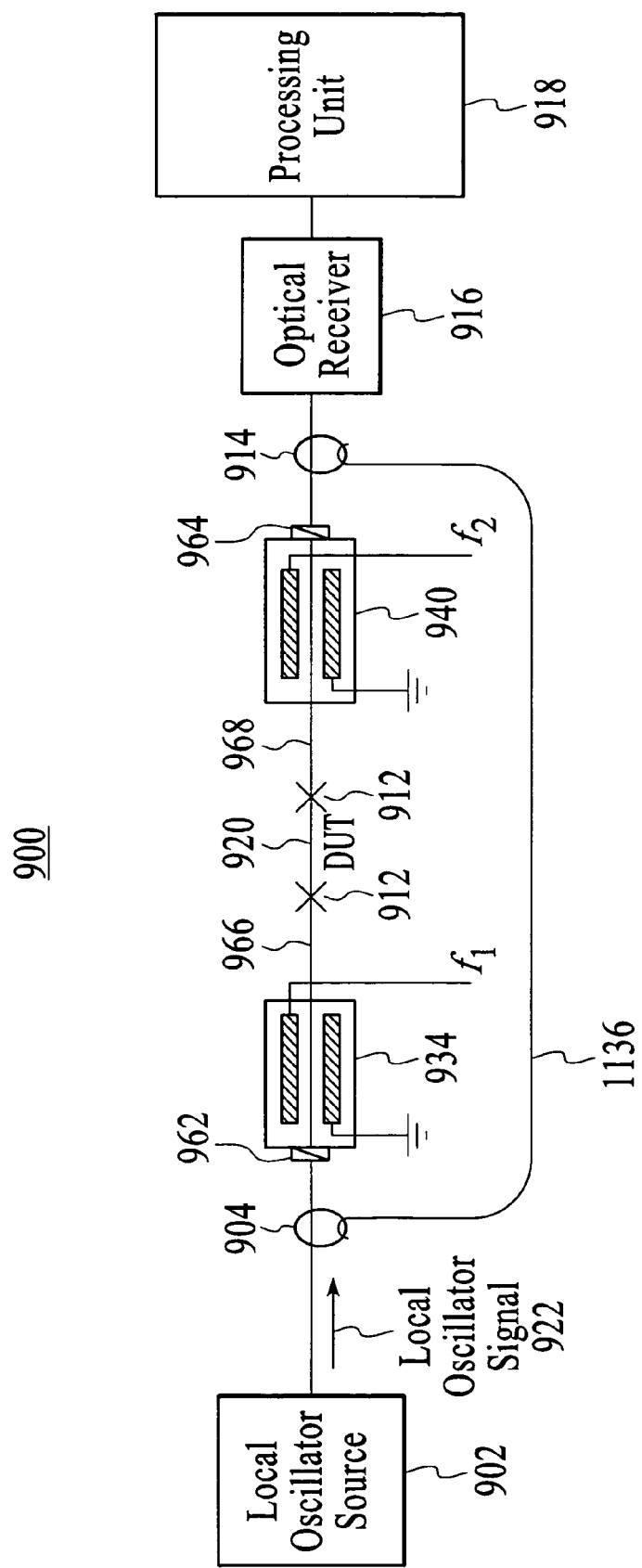
FIG. 9 depicts an embodiment in accordance with the invention of a system for measuring optical characteristics of a DUT that utilizes two modulators in series.

Although the systems described with reference to FIGS. 1 and 4 divide the local oscillator signal into test and reference portions to impart the different modulation frequencies, in alternative embodiments, two different modulation frequencies can be applied to the test portion of the local oscillator signal after the local oscillator signal is divided into a test portion and a reference portion. FIG. 9 depicts an example of a system 900 in which two modulation frequencies are applied to the test portion of the signal after the local oscillator signal is divided into separate portions. The system includes a local oscillator source 902, an optical splitter, 904, a first modulator 934, a DUT interface 912 (for connecting to a DUT 920), a second modulator 940, an optical combining unit 914, an optical receiver 916, and a processing unit 918.

Operation of the system 900 described with reference to FIG. 9 involves generating a local oscillator signal that is swept across a range of wavelengths. The local oscillator signal is divided into test and reference portions and the test portion is modulated at a frequency $f_1$ by the first modulator 934 and then provided to the DUT 920. After interacting with the DUT, the test portion of the local oscillator signal is modulated at frequency $f_2$ by the second modulator 940, where the modulation frequencies, $f_1$ and $f_2$, differ from each other. The test portion of the local oscillator signal is then combined with the reference portion of the local oscillator signal and the combined optical signal is detected and mixed by the optical receiver 916. Electrical signals generated by the optical receiver are received by the processor 918 and processed to determine at least one optical characteristic of the DUT. In particular, the amplitude, phase, and group delay response of the DUT can be determined in response to the received optical signal. The system may include polarizers 962 and 964 and a polarization diverse receiver (not shown) when polarization dependent characteristics are to be measured).

Figure 10:
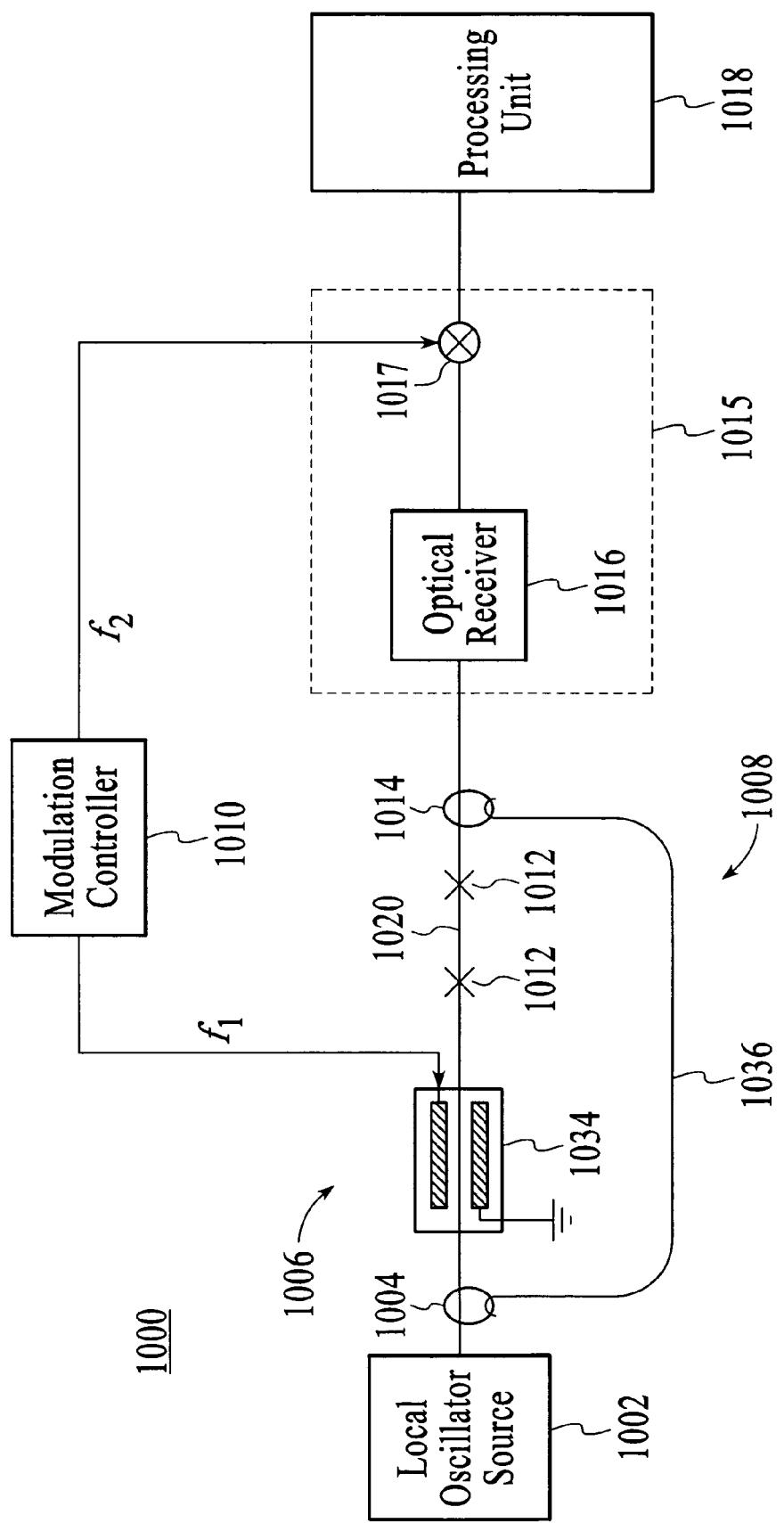
FIG. 10 depicts a system for measuring the amplitude, phase, and group delay response of a DUT that utilizes electrical mixing.

In another alternative embodiment, frequency translation is achieved by mixing two electrical signals in addition to the optical mixing of the optical test and reference signals. Specifically, the optical spectral peaks of the optical signal modulated at a frequency $f_1$ are combined with the reference portion of the local oscillator signal and optically mixed at an optical receiver to produce electrical signals near the electrical frequency $f_1$. Then, the electrical signals from the optical receiver are electrically mixed with an electrical signal at frequency $f_2$ to produce an electrical signal that is translated to the electrical frequency $f_1-f_2$. As in the embodiment illustrated in FIG. 1, the electrical signal near the frequency $f_1-f_2$ contains the phase difference between the sidebands of the optical test signal that propagated through the DUT. In the case of electrical mixing, the bandwidth of the optical receiver has to accommodate the electrical frequency $f_1$. However, the bandwidth of the processing unit can be limited to the electrical frequency $f_1-f_2$. FIG. 10 depicts an example of another system 1000 for analyzing optical properties in accordance with the invention that utilizes electrical mixing of two signals. The system of FIG. 10 includes a local oscillator source 1002, an optical splitter 1004, a test arm 1006, a reference arm 1008, a modulation controller 1010, a DUT interface 1012 (shown connected to a DUT 1020), an optical combining unit 1014, a receiving/mixing system 1015 that includes an optical receiver 1016 and an electrical mixer 1017, and a processing unit. The system 1000 is similar to the system 100 in FIG. 1 except that the reference portion of the local oscillator signal is not modulated. Instead, an electrical signal at the frequency of $f_2$ is generated by the modulation controller and electrically mixed with the electrical signal that is generated within the optical receiver 1016 from the combined modulated test portion of the local oscillator signal in the test arm and the reference portion of the local oscillator signal in the reference arm 1008. The electrical mixing translates the frequencies of the two signals down to a desired electrical frequency near $f_1-f_2$. The translated signals are then processed as described above to characterize the desired properties of the DUT.

Figure 11:
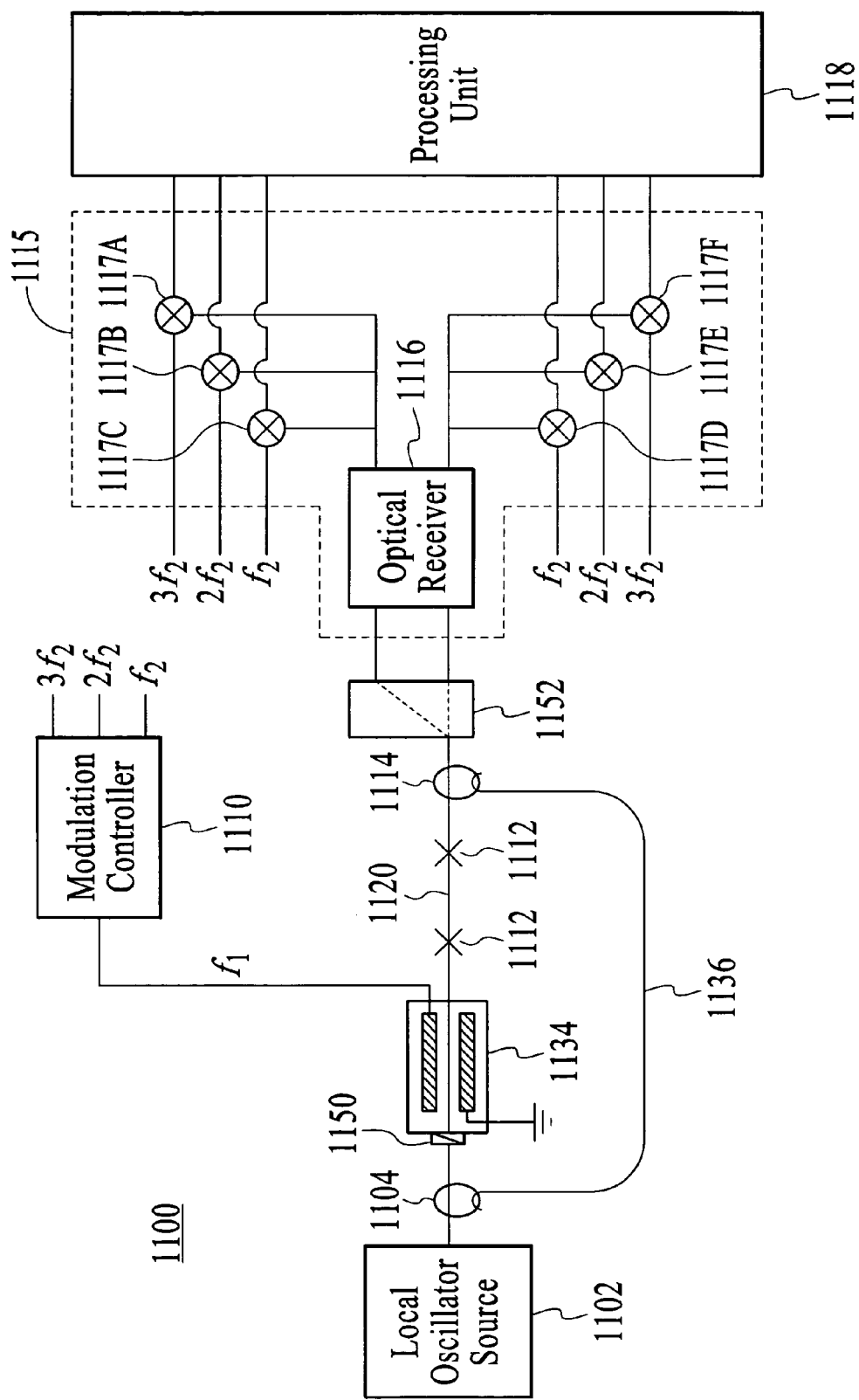
FIG. 11 depicts a system for measuring polarization dependent characteristics of a DUT that utilizes electrical mixing.

A system 1100 for measuring polarization dependent characteristics of a DUT (including differential group delay) is depicted in FIG. 11. The system 1100 is similar to the system 400 of FIG. 4 except that the reference portion of the local oscillator signal is not modulated and the signals are received and mixed in the receiving/mixing system 1115. The system 1100 operates using electrical mixing similar to the system 1000 of FIG. 10. Using the system of FIG. 11, the test portion of the local oscillator signal is polarization modulated at frequency $f_1$, applied to the DUT, and then combined with the unmodulated reference portion of the local oscillator signal. The combined optical signal is detected at the optical receiver 1116, which is a polarization diverse receiver. The modulation controller also generates three electrical signals at frequencies $f_2$, $2f_2$, and $3f_2$. The electrical signals are electrically mixed with the electrical signals that are generated from the received combined optical signal. The electrical mixing translates the frequencies of the mixed signals down to desired electrical frequencies near $\Delta f$, $2\Delta f$, and $3\Delta f$ where $\Delta f=f_1-f_2$. The translated signals are then processed as described above with reference to FIG. 4 to characterize the desired polarization dependent properties of the DUT.

Figure 12A:
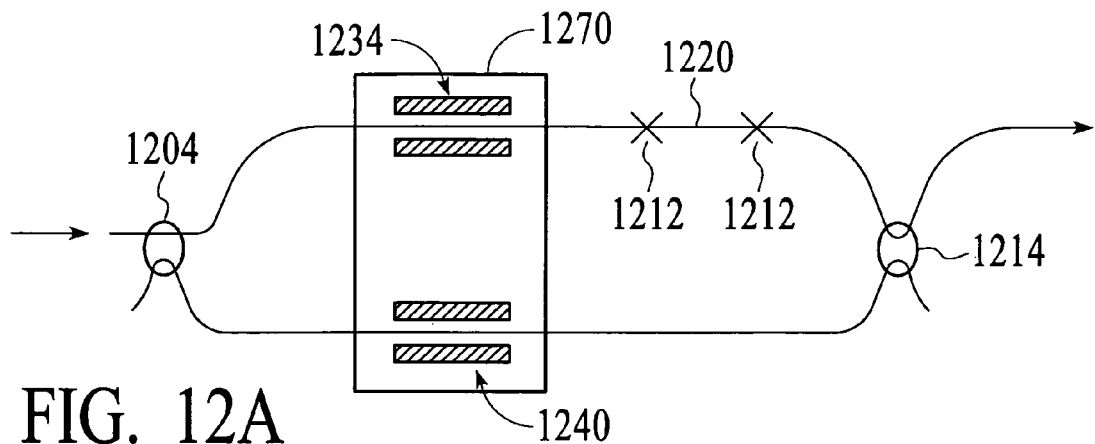
FIG. 12A depicts an integrated optical element that can be used with the systems of FIGS. 1 and 4, which includes two modulators.
Figure 12B:
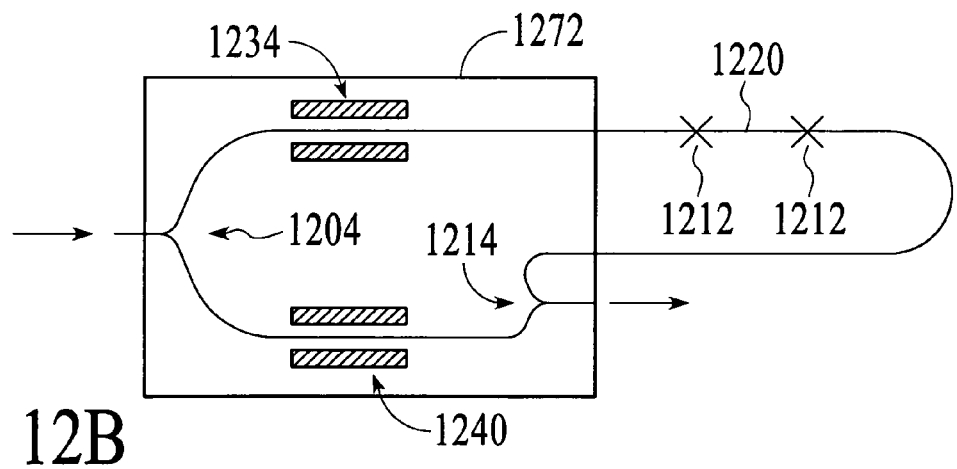
FIG. 12B depicts an integrated optical element that can be used with the systems of FIGS. 1 and 4, which includes two modulators, a splitter, and a coupler.
Figure 12C:
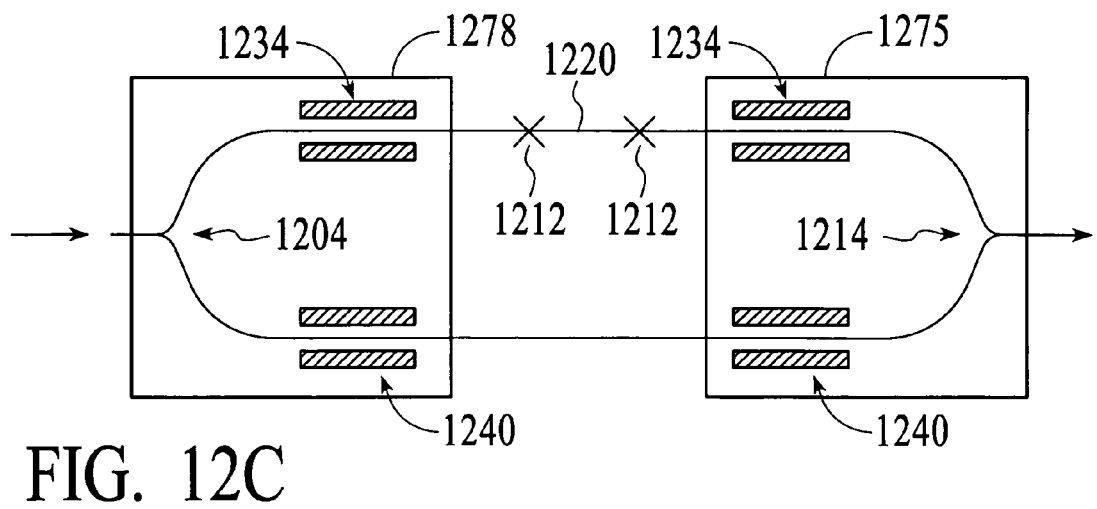
FIG. 12C depicts an two integrated optical elements that can be used with the systems of FIGS. 1 and 4, which include a splitter, a coupler, and modulators.

In another alternative embodiment, combinations of modulators, splitters, and couplers are included in an integrated optics chip or chips (e.g., planar waveguides). FIGS. 12A, 12B, and 12C depict examples of integrated optical elements that can be used with the systems of FIGS. 1 and 4. The system of FIG. 12A includes two modulators 1234 and 1240, which are included in an integrated optical element 1270. The system of FIG. 12B includes two modulators 1234 and 1240, an optical splitter 1204, and an optical coupler 1214. FIG. 12C includes two integrated optical elements 1273 and 1275 with the first element 1273 including an optical splitter 1204 and two modulators and the second element 1275 including an optical coupler 1214 and two modulators. The integrated modulators, splitters, and couplers perform functions that are equivalent to the corresponding optical elements in the systems of FIGS. 1 and 4. Any of these systems may include a polarizer at the input and a polarizing beam splitter at the output to support polarization-dependent analysis as described above with reference to FIG. 4.

Figure 13:
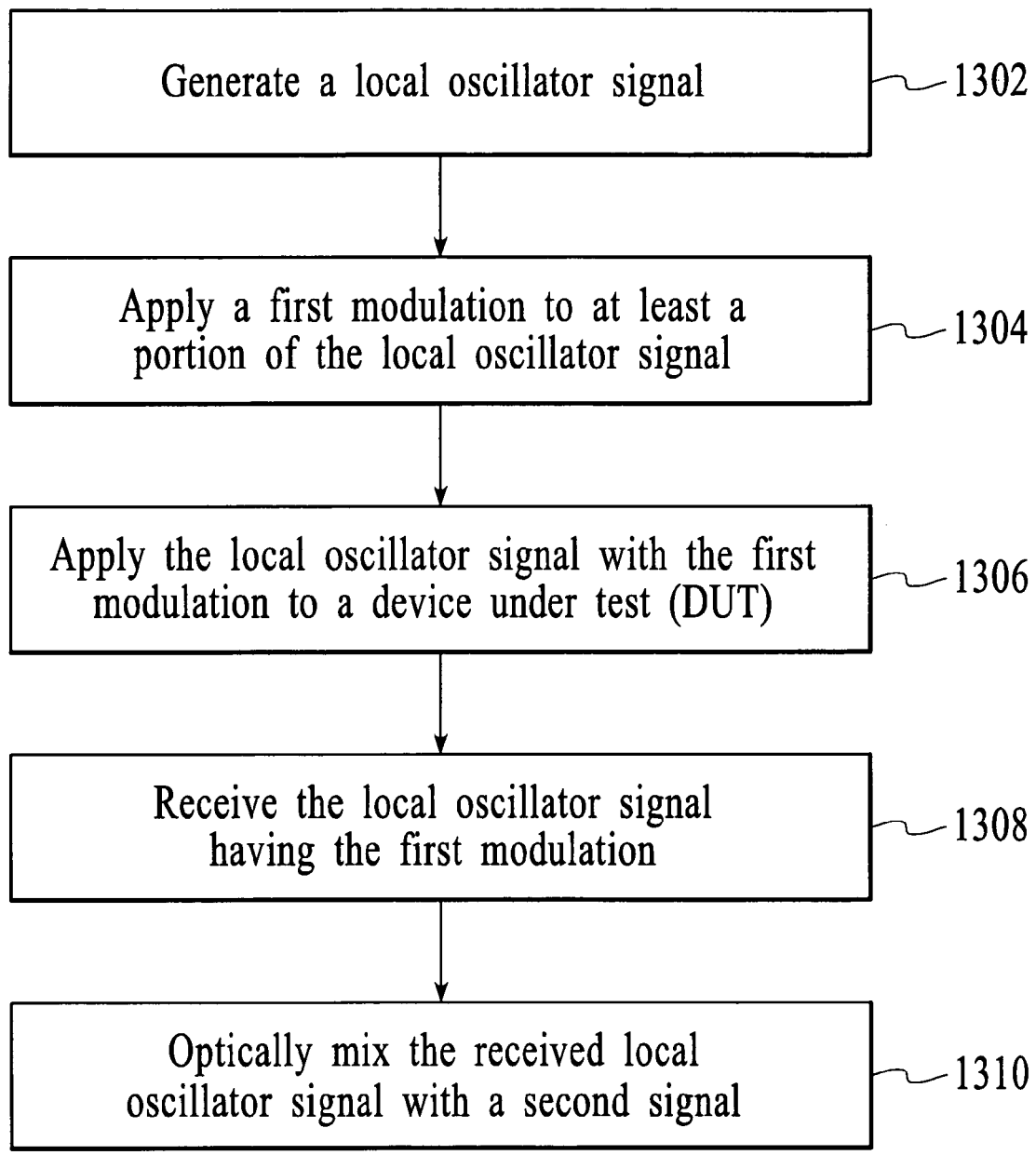
FIG. 13 depicts a process flow diagram of a method for analyzing optical properties of a DUT.

FIG. 13 depicts a process flow diagram of a method for characterizing an optical property. At block 1302, a local oscillator signal is generated. At block 1304, a first modulation is applied to at least a portion of the local oscillator signal. At block 1306, the local oscillator signal with said first modulation is applied to a DUT. At block 1308, the local oscillator signal having the first modulation is received. At block 1310, the received local oscillator signal is optically mixed with a second signal.

Although specific embodiments in accordance with the invention have been described and illustrated, the invention is not limited to the specific forms and arrangements of parts so described and illustrated. The invention is limited only by the claims.

What is claimed is:

1. A method for analyzing optical properties comprising:
generating a local oscillator signal;
applying a first modulation to at least a portion of said local oscillator signal;
applying said local oscillator signal with said first modulation to a device under test (DUT);
receiving said local oscillator signal having said first modulation; and
optically mixing said received local oscillator signal with a second signal.

2. The method of claim 1 further including processing electrical signals from said receiving and mixing to characterize a group delay property of said DUT.

3. The method of claim 1 further including processing electrical signals from said receiving and mixing to characterize an amplitude property of said DUT.

4. The method of claim 1 wherein applying said first modulation includes at least one of phase modulating, polarization modulating, and intensity modulating at least a portion of said local oscillator signal.

5. The method of claim 1 wherein said second signal is generated by applying a second modulation to at least a portion of said local oscillator signal and further including combining said portion of said local oscillator signal having said first modulation with said portion of said local oscillator signal having said second modulation before said receiving and mixing.

6. The method of claim 5 wherein said first modulation is applied in response to a first electrical signal and said second modulation is applied in response to a second electrical signal, said first electrical signal and said second signal having different frequencies.

7. The method of claim 1 further including electrically mixing an electrical signal generated from said receiving and optical mixing with a different electrical signal.

8. The method of claim 1 wherein applying said first modulation includes polarization modulating at least a portion of said local oscillator signal and further including processing electrical signals from said receiving and mixing to determine elements of the Jones matrix.

9. The method of claim 1 wherein applying said first modulation includes polarization modulating at least a portion of said local oscillator signal and further including processing electrical signals from said receiving and mixing to characterize differential group delay.

10. A system for analyzing optical properties comprising:
a local oscillator source for generating a local oscillator signal;
a modulation controller configured to provide a first electrical signal at a first frequency;
a first optical signal modulator optically connected to modulate at least a portion of said local oscillator signal in response to said first electrical signal;
a device under test (DUT) interface in optical communication with said first modulator; and
a system, in optical communication with said first optical signal modulator and said DUT interface, for receiving said local oscillator signal that is modulated in response to said first electrical signal and optically mixing said received local oscillator signal with a second signal.

11. The system of claim 10 further including a processing unit in signal communication with said receiving and mixing system configured to process an electrical signal to characterize a group delay property of a DUT that is optically connected to said DUT interface.

12. The system of claim 10 further including a processing unit in signal communication with said receiving and mixing system configured to process an electrical signal to characterize an amplitude property of a DUT that is optically connected to said DUT interface.

13. The system of claim 10 wherein said first optical signal modulator is one of a phase modulator, a polarization modulator, and an intensity modulator.

14. The system of claim 10 further including a second optical signal modulator optically connected to modulate at least a portion of said local oscillator signal in response to a second electrical signal from said modulation controller and an optical combining unit in optical communication with said DUT interface and said second optical signal modulator for combining said local oscillator signal that is modulated in response to said first electrical signal with said local oscillator signal that is modulated in response to said second electrical signal.

15. The system of claim 14 wherein said first electrical signal and said second electrical signal have different frequencies.

16. The system of claim 10 further including an electrical mixer that is configured to electrically mix a different electrical signal with an electrical signal generated from said local oscillator signal that is modulated in response to said first electrical signal.

17. The system of claim 10 wherein said first optical signal modulator is a polarization modulator and wherein said receiving and mixing system includes a polarization diverse receiver.

18. The system of claim 17 further including a processing unit in signal communication with said receiving and mixing system configured to process an electrical signal to determine elements of the Jones matrix.

19. The system of claim 17 further including a processing unit in signal communication with said receiving and mixing system configured to process an electrical signal to characterize differential group delay.

20. A system for analyzing optical properties comprising:
a local oscillator source for generating a local oscillator signal;
a first modulator optically connected to modulate at least a portion of said local oscillator signal;
a device under test (DUT) interface in optical communication with said first modulator;
a second modulator optically connected to modulate at least a portion of said local oscillator signal; and
an optical receiver in optical communication with said first modulator, said DUT interface, and said second modulator, said optical receiver configured to receive and optically mix said local oscillator signal having said first and second modulations.

21. The system of claim 20 further including a processing unit in signal communication with said optical receiver, said processing unit configured to process an electrical signal received from said optical receiver to characterize a group delay property of a DUT that is optically connected to said DUT interface.

22. The system of claim 20 wherein said test signal modulator is a polarization modulator and wherein said optical receiver is a polarization diverse receiver, said system further including a processing unit in signal communication with said polarization diverse receiver configured to process electrical signals from said polarization diverse receiver to characterize a differential group delay property of said DUT.

* * * * *